(12) United States Patent
Bussieres et al.

(10) Patent No.: US 7,747,023 B2
(45) Date of Patent: Jun. 29, 2010

(54) MULTI-USER QUANTUM CRYPTOGRAPHY METHOD AND SYSTEM USING WAVELENGTH DIVISION MULTIPLEXING

(76) Inventors: Felix Bussieres, 4428 Henri-Julien, Montreal, Quebec H2W 2K8 (CA); Nicolas Godbout, 2700 chemin Bedford, Montreal, Quebec H3S 1G1 (CA); Suzanne Lacroix, 253 rue Wilson, Verdun, Quebec H3E 1L2 (CA)

( * ) Notice: Subject to any disclaimer, the term of this patent is extended or adjusted under 35 U.S.C. 154(b) by 1191 days.

(21) Appl. No.: 11/136,996

(22) Filed: May 25, 2005

(65) Prior Publication Data
US 2006/0002563 A1 Jan. 5, 2006

Related U.S. Application Data

(60) Provisional application No. 60/573,851, filed on May 25, 2004.

(30) Foreign Application Priority Data
May 25, 2004 (CA) ..................... 2468222

(51) Int. Cl.
*H04L 9/08* (2006.01)
(52) U.S. Cl. ..................... 380/278; 713/171
(58) Field of Classification Search ............... None
See application file for complete search history.

(56) References Cited

U.S. PATENT DOCUMENTS 7,324,647 B1 * 1/2008 Elliott ..................... 380/278
7,457,416 B1 * 11/2008 Elliott ..................... 380/256
2003/0002674 A1 * 1/2003 Nambu et al. ............... 380/256

FOREIGN PATENT DOCUMENTS

CA 2 265 553 3/2007

OTHER PUBLICATIONS

Stinson, *Cryptography—Theory and Practice*, CRC Press Inc., 2000, pp. 124-156.
Nielson et al., *Quantum Computation and Quantum Information*, Cambridge University Press, 2000, 13-38.
Bennett et al., *Quantum Cryptography: Public Key Distribution and Coin Tossing*, Int. Conf. on Computers, Systems & Signal Processing, Bangalore, India, Dec. 10-12, 1984, pp. 175-179.
Gisin et al., *Quantum Cryptography*, Review of Modern Physics, vol. 74, Jan. 2002, pp. 145-195.
Ekert, *Quantum Cryptography Based on Bell's Theorem*, Phys. Rev. Lett., vol. 67, No. 6, Aug. 5, 1991, pp. 661-663.
Bennett et al., *Quantum Cryptography Without Bell's Theorem*, Phys. Rev. Lett., vol. 68, No. 5, Feb. 3, 1992, pp. 557-559.

(Continued)

*Primary Examiner*—Pramila Parthasarathy
(74) *Attorney, Agent, or Firm*—Fay Kaplun & Marcin, LLP

(57) ABSTRACT

A multi-user quantum cryptography system and method are described herein. The system comprises a relay including a quantum information server so configured as to generate quantum information communications having different wavelengths and a multiplexer so configured as to separate the different quantum information communications generated by the quantum information server by their wavelength and to supply each communication to a respective user.

6 Claims, 4 Drawing Sheets

OTHER PUBLICATIONS

Bennett et al., *Experimental Quantum Cryptography*, Journal of Cryptography, vol. 5, 1992, pp. 3-28.

Stucki et al., *Quantum Key Distribution Over 67 km with a Plug and Play System*, New Journal of Physics, vol. 4, 2002, pp. 41.1-41.8.

Grosshans et al., *Continuos Variable Quantum Cryptography Using Coherent States*, Phys. Rev. Lett., vol. 88, No. 5, Feb. 4, 2002, pp. 057902-1-057902-4.

Sun et al., *Long-distance Frequency-Division Interferometer for Communication and Quantum Cryptography*, Optics Letters, vol. 20, No. 9, May 1, 1995, pp. 1062-1064.

Agrawal, *Nonlinear Fiber Optics*, Third Edition, Academic Press, Ch. 4., pp. 97-265.

Bussieres, *Cryptographie quantique a plusieurs participants par mutiplexage en longueur d'onde*, Memoire de maitrise, Faculte des etudes superieures de l'Universite de Montreal, Oct. 2003, pp. 1-48.

Briegel et al., *Quantum repeaters: The role of imperfect local operations in Quantum communication*, Phys. Rev. Lett., vol. 81, No. 26, Dec. 28, 1998, pp. 5932-5935.

Bussieres et al., "Multi-user Quantum Cryptography using Wavelength Division Multiplexing", Photonics North 2003, May 25, 2003, 17 sheets.

Brassard et al., Multi-User Quantum Key Distribution Using Wavelength Division Multiplexing, Dec. 30, 2003, 5sheets.

\* cited by examiner

MULTI-USER QUANTUM CRYPTOGRAPHY METHOD AND SYSTEM USING WAVELENGTH DIVISION MULTIPLEXING

PRIORITY CLAIM

Priority is claimed to U.S. Provisional Patent Application Ser. No. 60/573,851 filed May 25, 2004 "Multi-User Quantum Cryptography Method and System using Wavelength Division Multiplexing". The entire disclosure of this prior application is considered as being part of the disclosure of the accompanying application and is hereby expressly incorporated by reference herewith.

FIELD OF THE INVENTION

The present invention relates to a method and system implementing multi-user quantum cryptography through wavelength division multiplexing (WDM).

BACKGROUND OF THE INVENTION

Fibre optic communication is and will be for a long time an essential, integral component of telecommunication systems. For example, telephone networks, the Internet, cable television networks and banking networks routinely use optical fibres to transmit huge quantities of data.

The conveyed data are often of confidential nature, for example a credit card number or a password providing remote access to a computer system. To ensure confidentiality, the conveyed information is ciphered by means of "classical" methods whose security stands from the hypothesis, until now unproven but also not rebutted, that the computational time required to break the cipher is much too long [1]. However, the unforeseeable nature of scientific discoveries as well as the development of the presently known technologies may lead to techniques capable of breaking these classical ciphering methods through a quantum computer [2].

A solution to this problem was discovered in 1984 as reported in an article by C. H. Bennett and G. Brassard [3]. This solution consists of a new method called quantum cryptography (QC) or, more specifically, quantum key distribution. In the foregoing disclosure, we shall make no difference between these two expressions. Since its discovery, feasibility of quantum cryptography with optical fibre signals has been demonstrated many times (see [4] for a review of this domain). The advantage of the quantum cryptography method is that its security is unconditionally warranted by the laws of physics against any possible attack, which overcomes the problems inherent to the above-discussed "classical" ciphering methods. The presently available quantum cryptography concepts are generally designed to allow only two users to communicate with each other under absolute confidentiality.

In view of allowing a greater number of users to use quantum cryptography in an optical network, a new architecture is required.

OBJECTS OF THE INVENTION

An object of the present invention is therefore to provide a multi-user quantum cryptography method and system using wavelength division multiplexing.

SUMMARY OF THE INVENTION

Therefore, the present invention relates to a multi-user quantum cryptography method and system using wavelength division multiplexing (WDM) that allows more than two users to confidentially communicate with each other by means of any protocol of quantum cryptography.

More specifically, in accordance with the present invention, there is provided a multi-user quantum cryptography system comprising:

a quantum information server provided with an output; said server being so configured as to provide quantum information communication capabilities on different wavelengths via said output;

a multiplexer having an input associated with said output of said quantum information server and multiple outputs; said multiplexer being so configured as to separate the different quantum information communications by their wavelength and to supply each quantum information communication to a respective one of said multiple outputs;

wherein each user is associated with a respective one of said multiple outputs to receive a quantum information communication.

According to another aspect of the present invention, there is provided a multi-user quantum cryptography method comprising:

generating a plurality of quantum information communications having different wavelengths;

separating the plurality of quantum information communications by their wavelength;

supplying each quantum information communication to a respective user.

It is to be noted that the present disclosure includes many references to other documents. These referenced documents are hereby included by reference in their entirety.

The foregoing and other objects, advantages and features of the present invention will become more apparent upon reading of the following non restrictive description of an illustrative embodiment thereof, given by way of example only with reference to the accompanying drawings.

DETAILED DESCRIPTION

Figure 1:
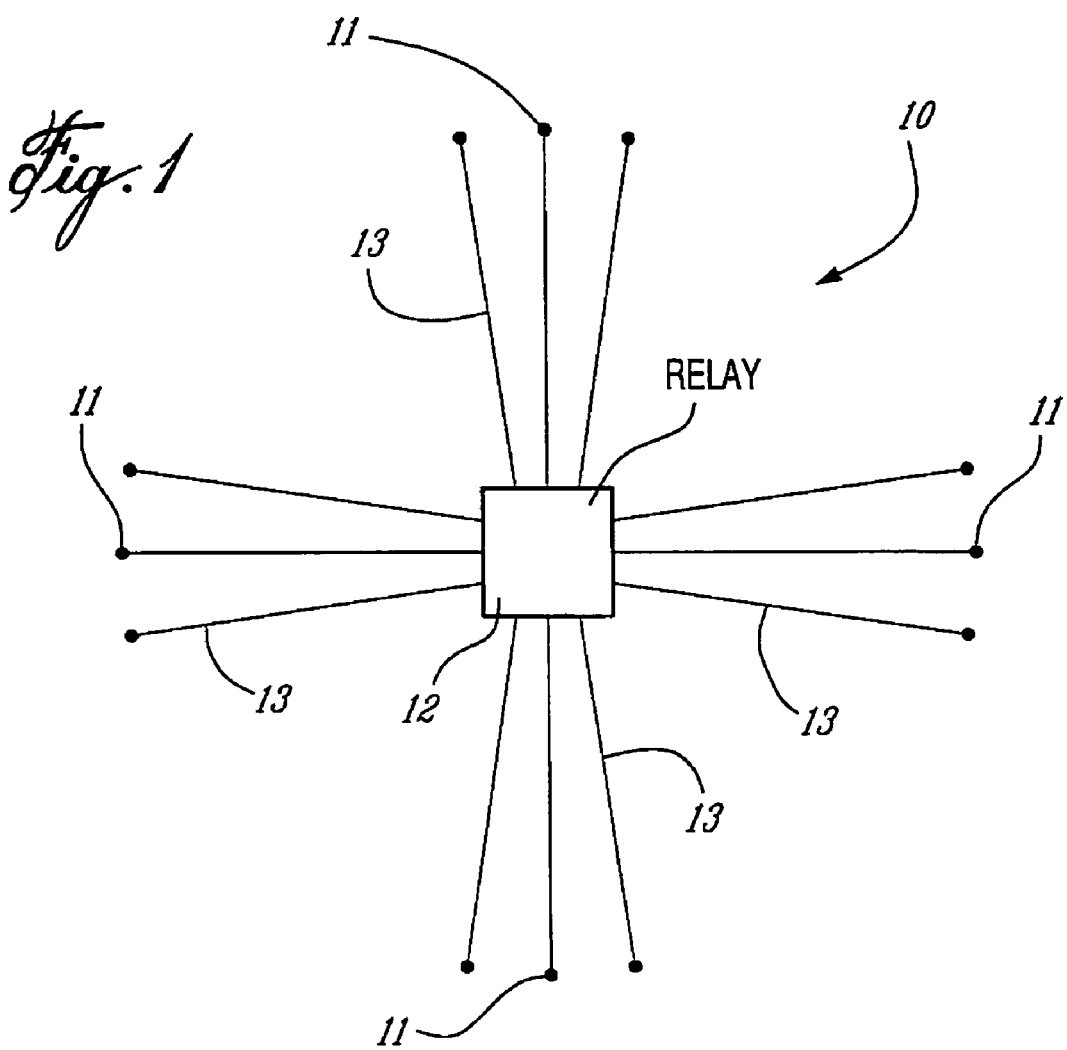
FIG. 1 is a schematic block diagram illustrating the architecture of a quantum cryptography optical network designed for many users according to a non-restrictive illustrative embodiment of the present invention.

"Classical" cryptography is divided into two categories [1]. The first category, so-called private key cryptography, is unconditionally secure but it cannot be easily implanted on a large scale since it requires all the users to continuously renew their cryptographic keys to sustain confidential communications. By means of classical methods, it is unknown how to securely perform this task which, in returns, renders the sole usage of private-key cryptography completely unpractical. To be practical, private-key cryptography has to be combined with either quantum cryptography or with so-called public key cryptography, the second category of classical cryptography. However, this second category is not known to be unconditionally secure, which leaves us with no warranty of absolute secrecy in practical networks with classical cryptography only.

Generally stated, quantum cryptography is a technology capable of remotely generating an arbitrarily long and unconditionally secret cryptographic key between two distant users wishing to communicate with absolute confidentiality. A cryptographic key can be defined, for example, as a chain of random and secret bits known only by two physically distant users. This condition enables the communication of classical information from any one of these two users to the other one with absolute confidentiality using secure classical private-key protocols such as the "one-time pad" [1]. Cryptographic keys are otherwise believed well known to those of ordinary skill in the art and, accordingly, will not be further described in the present specification.

Quantum cryptography presents another important advantage over classical cryptography. Indeed, it is capable of revealing the presence of a spy on the channel interconnecting the first and second users [6]. This particularity is a consequence of the Heisenberg uncertainty principle, and is made possible since the presence of a spy on the communication channel creates errors on the cryptography key generated by the protocol. These errors are not only detectable through collaboration between the first and second users, but they also indicate the quantity of information the spy has obtained about the cryptographic key. On the contrary, classical cryptography allows a spy to read, at will and without being detected, any communication between the first and second users.

There exist two classes of quantum cryptography. These two classes distinguish from each other by the use or not of entanglement.

The first class of quantum cryptography, which does not use entanglement, can be summarized in the following manner with reference to FIG. 1: a first user 11 sends through an optical fibre 13 quantum information in the form of an optical signal having certain properties (polarization, phase and/or amplitude, wavelength, etc.) modulated in a controlled, secret manner in accordance with a quantum cryptography protocol. The light signals, in the form of photons transmitted with the signal are entangled with no other physical system. A second user 11 receives the photons and measures the property in accordance with a strategy determined by the protocol. Then, the first and second users use their respective data to extract the cryptographic key. Notice the light signals don't carry key information. The key is rather generated after the completion of above described procedure by the virtue of the probabilistic nature of measurements on quantum systems. It is to be noted that some protocols require that light be transmitted in both directions. The quantum information itself may in this case be transmitted either in one or both directions depending on the protocol and its implementation.

As mentioned hereinabove, the second class of quantum cryptography uses entanglement which is a property related to a set of two separate physical systems that exhibit instantaneous correlations between the results of measurements carried out on two separate physical systems [2].

A definition of entanglement between two physical systems is given as below [2]:

A qubit is the generic description of a quantum system on which quantum information can be encoded, as opposed to the bit which represents the encoding classical information [2]. More specifically, a qubit is a system with a measurable quantity having two accessible levels designated by |0> and |1>, these two levels forming part of an orthonormal base. Let's consider the so-called pure quantum state of two qubits. The state of the joint system can be written, in a general manner, as the development on the tensor product of the respective bases of the two qubits, i.e. $\{|b>_1 \otimes |b'>_2 \equiv |bb'>\}$, where b, b'$\in\{0,1\}$ and where the indicia are related to the respective qubits. One can therefore write the global state $|\psi>$ as:

$$|\psi>=\alpha|00>+\beta|01>+\gamma|10>+\delta|11>$$

where the complex coefficients satisfy the condition of normalization. It can be quite easily demonstrated that when the relation $\alpha\delta=\beta\gamma$ is not satisfied, then the global state cannot be factorized into a tensor product of the individual states of the two qubits, that is $|\psi>\neq|\psi_1>|\psi_2>$. In this particular case, the two qubits are said to be entangled. Otherwise, the state is said to be separable. For example, the state $$|\Phi^+> = \frac{1}{\sqrt{2}}(|00> + |11>)$$

is an entangled state.

In a completely general manner, the state of a quantum system comprising several subsystems labeled 1 through N can be written in the form of a density operator $\rho$. We say the subsystems are entangled if $\rho$ cannot be written in the form of a tensor product of the individual states of the systems, that is $\rho \neq \rho_1 \otimes \rho_2 \otimes \ldots \otimes \rho_N$. Entanglement is believed to be otherwise well known to those of ordinary skill in the art and, accordingly, will not be further described in the present specification.

It is known that entanglement can be used to remotely generate an unconditionally secure cryptographic key when one of the two entangled systems is given to the first user and the other of these two entangled systems is given to the second user (see [5] and [6]). The method using entanglement can be summarized with reference to FIG. 1: two users 11 are connected through an optical fibre over which they can bidirectionally transmit light signals between each other. The fibre is used to share entangled light signals that are prepared either by one of the two users or by a relay 12 who has a physical access to the fibre 13. In both cases, one part of the entangled systems is sent to the first user, and the second part is sent to the second user. The quantum states of the entangled systems are prepared according to the protocol used to generate the cryptographic key. Upon the reception of the light signals, the users measure the entangled property (polarization, phase and/or amplitude, wavelength, etc.) in accordance with the strategy determined by the protocol. Then, the first and second users use their respective data to extract the cryptographic key.

The feasibility of quantum cryptography on an optical fibre has been demonstrated. Many properties of light can be exploited and propositions were made with polarization [7], the relative phase between optical pulses [8], quadrature of the electrical field [9] and, finally, frequency [10]. One particular example is the generation by Stucki et al. of a quantum cryptography key by using an underground fibre 67 km long [8].

Optical Network Without Shared Entanglement Between the Users

A multi-user quantum cryptography method and system that does not use shared entanglement between the users according to a first non-restrictive embodiment of the present invention will now be described with reference to the accompanying FIGS. 1 to 4.

FIG. 1 illustrates the architecture of a quantum cryptography optical network 10 designed for many users.

As can be seen in FIG. 1, the architecture of the quantum cryptography optical network 10 presents the general configuration of a star network.

In a star network, the users such as 11 are not directly connected to each other. More specifically, each user 11 is connected to a central relay 12 through a single communication channel such as 13, for instance an optical fibre. As can be seen in FIG. 1, there is provided one channel 13 per user 11. Each channel 13 constitutes a bidirectional communication channel whereby each pair of users 11 can communicate with each other through the central relay 12.

Figure 2:
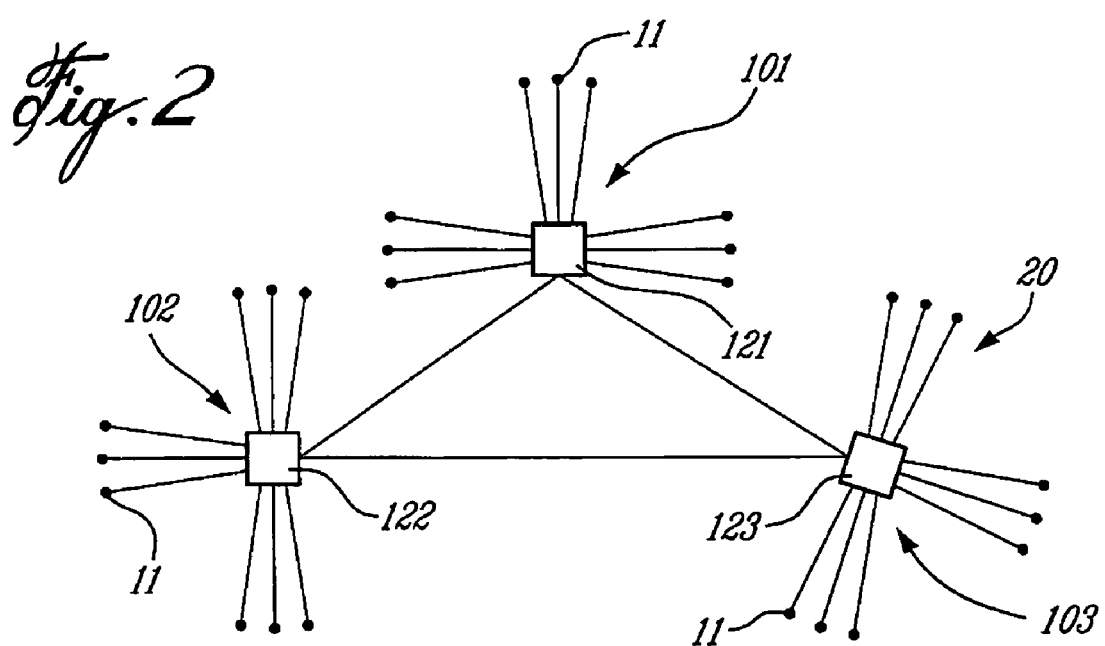
FIG. 2 is a schematic block diagram of an illustrative example of a more complex network structure including a plurality of quantum cryptography optical network as illustrated in FIG. 1.

As illustrated in FIG. 2, a quantum cryptography optical network 10 as shown in FIG. 1 may form part of a more complex network structure 20 comprising a plurality of similar star networks 101-103. To allow two users 11 or a same network 101, 102 or 103 or from two different networks 101;102, 101;103 or 102;103, to confidentially communicate with each other, the relays 121, 122 and 123 must be made secure. We call a secure relay one that does not reveal any confidential information to any potential eavesdropper, whether this would be intended or not. At least one secure relay such as 121-123 must be interposed between the two users 11. For that purpose, the secure relay to which the first user is connected establishes a first secret cryptographic key $k_a$ using standard quantum cryptographic methods, while the secure relay (which can be the same or a different relay) to which the second user is connected establishes a second secret cryptographic key $k_b$ using standard quantum cryptographic methods. This allows the first and second users to confidentially communicate with each other using one of the following three (3) methods:

1. When the first and second users 11 are connected to the same relay 121, 122 or 123, the first user ciphers his message using a cryptographic key $k_a$, sends the ciphered message to the relay that deciphers the message, ciphers it again using a cryptographic key $k_b$, and finally sends the message to the second user;

2. When the first and second users 11 are connected to the same relay 121,122 or 123, that relay, which knows both cryptographic keys $k_a$ and $k_b$, indicates to the first user which bits of the second cryptographic key $k_b$ have to be inverted, i.e. changing a "0" for a "1" or vice versa, to obtain the first cryptographic key $k_a$; no other information is revealed.

This allows the first and second users to communicate with each other through the channel they choose, and not necessarily the channel passing through the same relay.

3. When the first and second users 11 are respectively connected to different central relays such as 121, 122 and 123, these relays must first establish a secret cryptographic key for communication with each other and, then, may use one of the above-described methods 1 and 2. For example, the relay 121 establishes a first cryptographic key $k_1$ with a first user 11 of the network 101, the relay 121 establishes a second cryptographic key $k_2$ with the relay 123, and the relay 123 establishes a third cryptographic key $k_3$ with a second user 11 of the network 103. Then, through public communication as described in the subject specification, key $k_3$ can be converted to key $k_1$ so that the first and second users can communicate secretly with each other.

Of course, with the above described methods 1, 2 and 3, the relay or relays such as 121, 122 and/or 123 must be secure since it knows or they know all the cryptographic keys.

Figure 3:
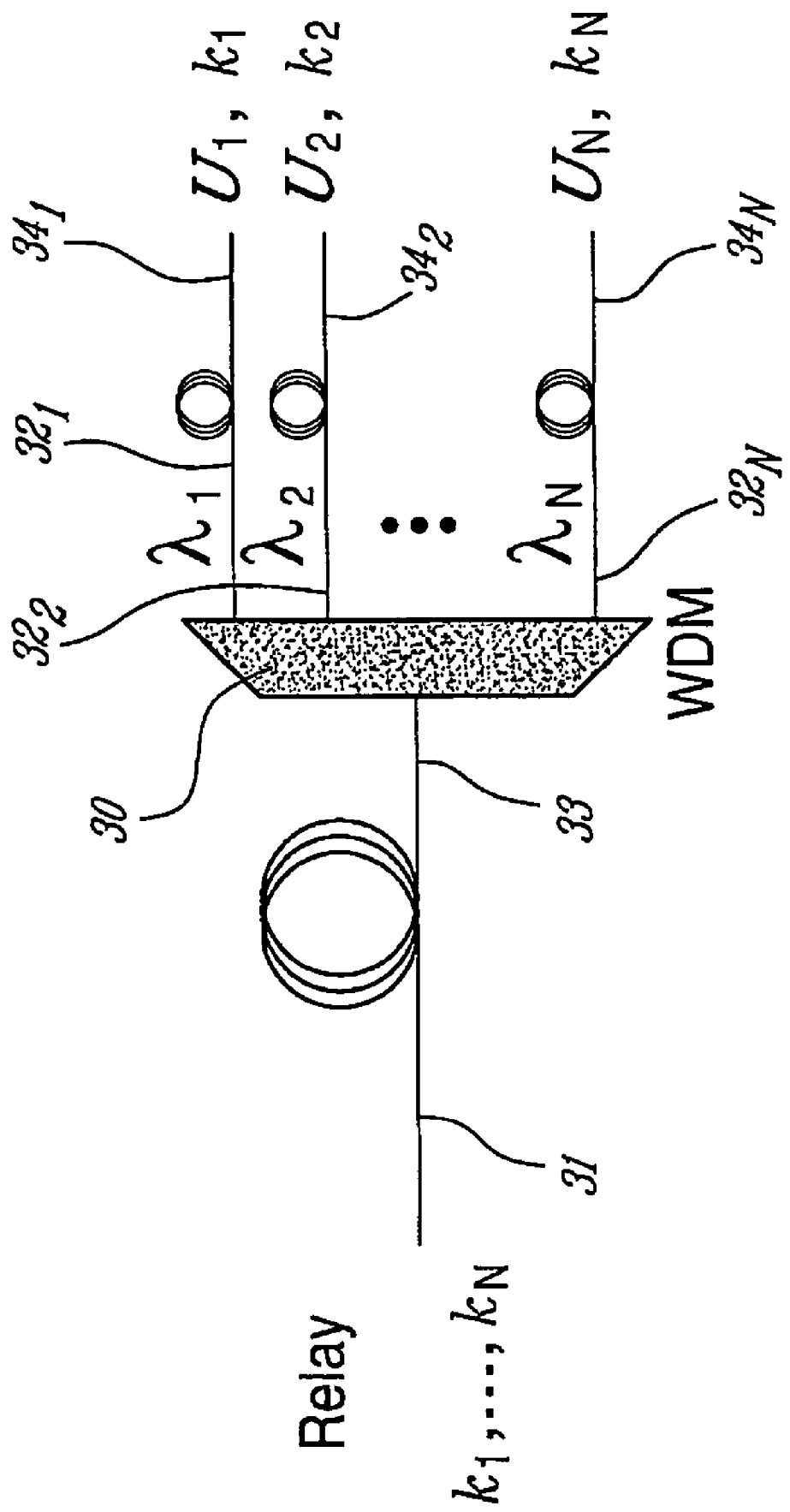
FIG. 3 is a schematic block diagram of a simple solution to create a star network using Wavelength Division Multiplexing (WDM) according to a non-restrictive illustrative embodiment of the present invention.

A solution to create a star network is to use Wavelength Division Multiplexing (WDM). In principle, an optical fibre such as 31 in FIG. 3 can guide a wide range of wavelengths that can independently transport information, provided that the power and modulation rate are not too high [11]. Each wavelength is equivalent to a communication channel. A multiplexer/demultiplexer such as 30 in FIG. 3 is a component comprising:

N physical inputs/outputs such as $32_1, 32_2, \ldots, 32_N$ at N different wavelengths $\lambda_1, \lambda_2, \ldots, \lambda_N$ and respectively connected to the users 11 ($U_1, U_2, \ldots, U_N$) using respective cryptographic keys $k_1, k_2, \ldots, k_N$ through respective optical fibres $34_1, 34_2, \ldots, 34_N$; and a single physical output/input 33 guiding all of the wavelengths $\lambda_1, \lambda_2, \ldots, \lambda_N$ and connected to the relay through the optical fibre 31.

Therefore, a single physical channel (the optical fibre 31) guides the N communication channels. Extraction of the wavelengths $\lambda_1, \lambda_2, \ldots, \lambda_N$ from the optical fibre 31 is made through a multiplexer/demultiplexer which is used in a demultiplexer mode, i.e. that light travels in the opposite direction, i.e., 33 is then the input and $32_1, 32_2, \ldots, 32_N$ are then the outputs.

Referring back to the network of FIG. 2, the use of a wavelength multiplexer/demultiplexer 30 enables a relay to establish direct, bidirectional communication with one of the users 11 ($U_1, U_2, \ldots, U_N$) by using a corresponding one of the wavelengths $\lambda_1, \lambda_2, \ldots, \lambda_N$.

Figure 4:
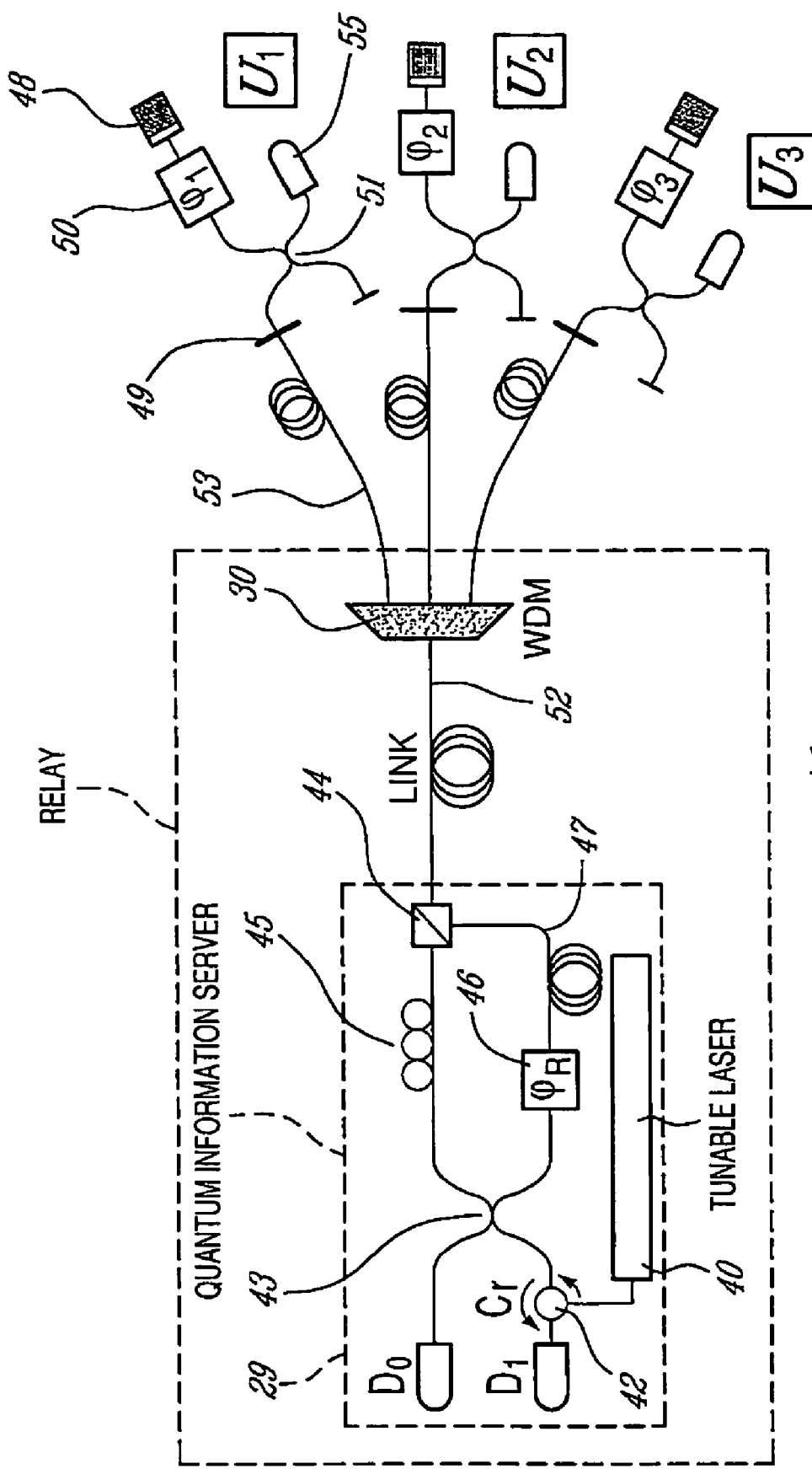
FIG. 4 is a schematic block diagram of a non limitative example of a relay for use in the network of FIG. 1 or the more complex network structure of FIG. 2.

FIG. 4 is an example of architecture showing how a relay such as 12, 121, 122 or 123 can communicate with the users 11 connected thereto using a Plug&Play configuration [8].

As can be seen from this figure, the relay includes two main elements, a quantum information server 29 and the Wavelength Division Multiplexer (WDM) 30, interconnected by an optic fibre link 52.

It is to be noted that while the server 29 and the WDM 30 are illustrated in FIG. 4 as being in a shared "enclosure", this is not necessarily the case. Indeed, the link 52 may be several kilometers long to enable the server and the WDM to be in different locations. It is also to be noted that a WDM having more than one input/output 33 could be shared between at least two servers such as 29.

As will be readily understood by the following description, the quantum information server 29 provides quantum information communication capabilities on different wavelengths through the use of the tunable laser 40. In other words, the quantum information server is a system capable of preparing and sending light signals for quantum and classical communication on a dedicated output; a system capable of receiving and measuring the state of the light signals received on a dedicated input; a system capable of preparing, sending and measuring the lights signals according to the minimal requirements of the quantum cryptography protocol in use; a system capable of communicating both classical and quantum information to other servers using channels assumed to be accessible to all the servers.

Referring to FIG. 4, generation of a key with the BB84 protocol ([1] and [8]) starts with transmission, by the tunable laser 40 of the quantum information server 29, of an intense and coherent pulse of limited duration. The pulse propagates through the optical circulator 42 and is divided in two pulses by the 50/50 coupler 43. The first pulse $P_c$ propagates through the short arm (polarization controller 45), and the second pulse $P_l$ propagates through the long arm (phase modulator 46 and optical fibre 47) where it is delayed by a period $\Delta t$ longer than the duration of the pulse. The phase modulator 46 is not activated upon the first passage of the pulse. The polarization in the short arm is modified by the polarization controller 45 in order to maximize transmission through the polarization separator 44. At the output of the polarization separator 44 and, therefore, at the output of the server 29, the polarizations of the first pulse $P_c$ and second pulse $P_l$ are horizontal and vertical, respectively. After transmission to a user, for example user $U_1$, through the multiplexer 30 and fibres 52 and 53, the pulses $P_c$ and $P_l$ are reflected one after the other by a Faraday mirror 48 and attenuated after reflection by an attenuator 49. The total power at the output correspond to an average number of photons by pulse typically equal to $\frac{1}{10}=0,1$. Preparation of BB84 states is made during the passage of the pulses $P_c$ and $P_l$ at the user $U_1$ by applying a phase shift $\phi_A$ randomly chosen in the set $\{0, \pi/2, \pi, 3\pi/2\}$ to pulse $P_l$ only. Synchronization of the phase modulator 50 of the user is made by detecting a fraction of the input power of the pulses through a detector 55 (for example a photodiode) via an optical coupler 51. After transmission through the fibres 52 and 53 and the demultiplexer 30 back to the quantum information server 29 after reflection on the Faraday mirror 48, the polarizations of the pulses $P_c$ and $P_l$ are exchanged. More specifically, pulse $P_c$ is transmitted through the long arm and pulse $P_l$ though the short arm. The quantum information server 29 then chooses the measurement base by applying the phase $\phi_B$ randomly chosen in the set $\{0, \pi/2\}$ to the pulse $P_c$. The delay between the two pulses $P_c$ and $P_l$ is fully compensated and, just before the coupler 43, the polarizations of pulses $P_c$ and $P_l$ are back to their initial state. An almost perfect interference is thereby obtained in the coupler 43. Depending on the phase difference $\phi_B-\phi_A$, the light pulse will be routed either deterministically or randomly to one of the two detectors $D_0$ and $D_1$. Then, following the procedures of the BB 84 protocol, the server 29 and user $U_1$ can generate a secure key.

For the sake of simplicity, the different electronic and computer controls for the components of FIG. 4 are not illustrated nor described. However, the nature and function of these various controls are believed known to those of ordinary skill in the art.

The architecture of FIG. 3 presents many advantages. First of all, it allows the central relay to communicate with all the users connected thereto either simultaneously or sequentially. Secondly, the losses are minimized in both directions. Finally, each channel is capable of supporting both classical and quantum communication, independently of whether the other channels are used or not.

Returning briefly to FIG. 2, it is to be noted that one of the methods to interconnect relays such as 121, 122 and 123 consists of using the relays as if they were users. More specifically, the relay 121 sees the relays 122 and 123 as if they were simply users with which they can share quantum information. Similarly, the relay 122 sees relays 121 and 123 as users and relay 123 sees relays 121 and 122 as users. By interconnecting them this way, quantum information may be transmitted both ways without the use of other type of hardware.

In other words, one or several users illustrated in FIG. 4 may be also be a relay, itself serving other remote users. A concatenation of systems such as shown in FIG. 4 constitutes one method of realizing a larger network such as shown in FIG. 2.

As will be understood by one skilled in the art, the above described system and method presents the disadvantage that the relays knows all the quantum cryptographic keys. These relays must therefore be secured so that they can be trusted to be legitimate participants of the network. However, it is possible to eliminate this drawback by using a protocol with entanglement as will be described hereinbelow.

Optical Network Using Shared Entanglement Between the Users

Figure 5:
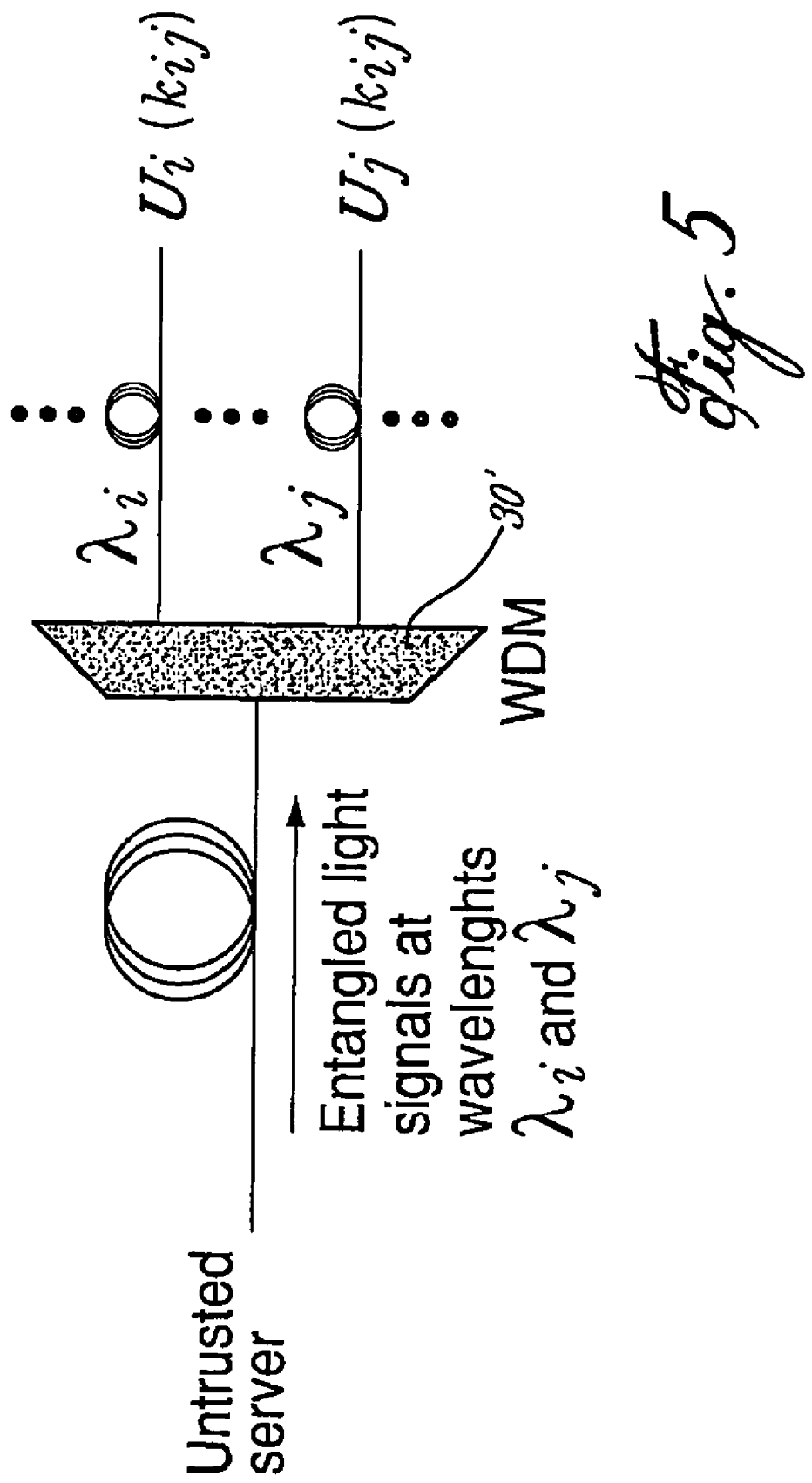
FIG. 5 is a schematic block diagram similar to FIG. 3 illustrating a WDM in the context of an optical network using shared entanglement between the users.

Referring now to FIGS. 5, a quantum cryptography optical network and method using shared entanglement between the users according to second embodiment of the present invention will be described.

FIG. 5 illustrates a general arrangement where an untrusted server, that is a server that doesn't need to be proven secure to function, is capable of generating two entangled light signals with different wavelengths $\lambda_i$ and $\lambda_j$. In other words, an untrusted server is a server which need not to be trusted to be a legitimate participant while still ensuring the confidentiality of the encryption keys generated using the network. Such servers are believed known in the art and will not be described in more detail herein.

The two light signals are sent onto the input fibre of the demultiplexer 30' and are routed to users $U_i$ and $U_j$ according to their wavelengths. After reception of the light signals, users $U_i$ and $U_j$ use standard quantum cryptographic methods using shared entanglement to generate a common key $k_{ij}$.

One advantage of this method is that the key is known by the users only and, in particular, unknown by the server [6]. Indeed, even if the server has full control over the quantum states it sends to $U_i$ and $U_j$ it cannot fool them into thinking that they have succeeded in establishing a cryptographic key when, in fact, the secrecy of their key is compromised by the server [6]. Therefore, the server cannot cheat or eavesdrop on the key without being caught with overwhelming probability.

Another advantage is that, instead of establishing a cryptographic key with every user, the relay can act as a source of entangled photon pairs, whatever the property of the photons that is entangled. The respective wavelengths of these two photons correspond to those of two users who wish to share a quantum cryptographic key. The entangled photons are guided toward the respective users, to allow the users to generate a quantum cryptographic key known only by themselves, and which is, in particular, unknown by the relay. The two users may subsequently communicate in a secure way without further use of the server. This is interesting since it may decrease the number of secure servers necessary, potentially reducing the overall cost of the network.

Presently, it is believed possible to fabricate components capable of multiplexing wavelengths spaced apart from each other by 0.4 nm. In other words, the frequencies are spaced apart from each other by 50 GHz. According to the ITU (International Telecommunication Union), such a spacing enables multiplexing of 237 channels between 1 524,50 et 1622,25 nm. Such components can be fabricated with low transmission losses of a few percent.

The proposed networks of FIGS. 1 to 5 are capable of supporting any quantum cryptographic protocol (with or without entanglement) between every user and the relay to which the user is connected, and between relays.

Another advantage is that the system and method described herein can be used with any type of optical transmission, multiplexer and quantum protocols, whether they are for cryptographic purposes, or for quantum communication or quantum computation [2]. This means that the invention is useful for any stage of advancement of the quantum cryptography technologies.

The present invention could be used in a plurality of different manners and at a plurality of different levels. On a small scale, the network, or any combination of many star networks could be used in a high security building. On a medium scale, it could be used to cover a metropolitan area or the campus of an organization whose surface area is lower or equal to $\pi d^2/4$, where d is the maximal distance over which quantum cryptography between two users can be implanted.

Finally, to increase the coverage of the network for distances greater than d, many options are and will be available for manufacturers in the future. A trivial solution is to introduce the number of secure relays required to cover the desired distance. In principle, a solution permitting to cover a well greater distance without adding secure relays exists: the quantum repeaters [13].

It is to be noted that even though the above description is concerned with a quantum cryptography method and system used in an optical fiber network context, it could also be used with networks having other transmission mediums such as, for example free space, as long as multiple signals with different wavelengths can be multiplexed on the transmission medium.

Although the present invention has been described in the foregoing specification by means of a non-restrictive illustrative embodiment, this illustrative embodiment can be modified at will within the scope, spirit and nature of the subject invention.

REFERENCES

[1] D. Stinson. *Cryptography—Theory and Practice*, CRC press Inc. (2000)
[2] M. Nielsen and I. Chuang. *Quantum Computation and Quantum Information*, Cambridge University Press (2000)
[3] C. H. Bennett and G. Brassard. Quantum cryptography: public key distribution and coin tossing, *Int. Conf. Computers, Systems & Signal Processing, Bangalore, India* (IEEE New York), 175-179 (1984)
[4] N. Gisin, G. Ribordy, W. Tittel and H. Zbinden. Quantum cryptography, *Rev. of Mod. Phys.* 74 145-195 (2002)
[5] A. Eckert. Quantum cryptography based on Bell's theorem, *Phys. Rev. Lett.* 67, 661-663 (1991)
[6] C. H. Bennett, G. Brassard et N.D. Mermin. Quantum cryptography without Bell's theorem, *Phys. Rev. Lett.* 68, 557-559 (1992)
[7] C. H. Bennett, F. Bessette, G. Brassard, L. Salvail and J. Smolin, Experimental quantum cryptography, *Journal of Cryptology* 5, 3-28 (1992)
[8] D. Stucki, N. Gisin, O. Guinnard, G. Ribordy and H. Zbinden. Quantum key distribution over 67 km with a plug&play system, *New. Jour. of Phys.* 4, 41.1-41.8 (2002)
[9] F. Grosshans, P. Grangier. Continuous variable quantum cryptography using coherent states, *Phys. Rev. Lett.* 88, 057902 (2002)
[10] P. C. Sun, Y. Mazurenko and Y. Fainman. Long-distance frequency-division interferometer for communication and quantum cryptography, *Optics Letters* 20, 1062-1063 (1995)
[11] G. P. Agrawal. *Nonlinear Fiber Optics, Third Edition*, Academic Press
[12] F. Bussières. Cryptographie quantique à plusieurs participants par multiplexage en longueur d'onde, *Mèmoire de maîtrise, Facultè des ètudes supèrieures de l'Universitè de Montrèal* (2003)
[13] H.-J. Briegel, W. Dur, J. I. Cirac and P. Zoller. Quantum repeaters: The role of imperfect local operations in quantum communication, *Phys. Rev. Lett.* 81, 5932-5935 (1998)

What is claimed is:

1. A multi-user quantum cryptography system comprising:
    a quantum information server provided with an output; said server being so configured as to provide quantum information communication capabilities on different wavelengths via said output; and
    a multiplexer having an input associated with said output of said quantum information server and multiple outputs; said multiplexer being so configured as to separate the different quantum information communications by their wavelength and to supply each quantum information communication to a respective one of said multiple outputs;
    wherein each user is associated with a respective one of said multiple outputs to receive the quantum information communication;
    wherein the quantum information communication includes pairs of entangled light signals having different wavelengths, each light signal of the entangled light signal pair being sent to a particular output of the multiplexer, whereby each light signal is sent to two different users; and
    wherein two users connected to two different outputs of the multiplexer use information from measurements on the entangled light signals to generate a secret encryption key using a quantum cryptography protocol.

2. The multi-user quantum cryptography system of claim 1, wherein said input of said multiplexer is associated with said output of said quantum information server via an optical fiber.

3. The multi-user quantum cryptography system of claim 1, wherein each user is associated with a respective one of said multiple outputs of said multiplexer via an optical fiber.

4. The multi-user quantum cryptography system of claim 1, wherein said multiplexer is a multiplexer/demultiplexer, allowing bidirectional quantum information communication capabilities between the quantum information server and the user.

5. The multi-user quantum cryptography system of claim 1, wherein said quantum information communication from the quantum communication server includes light that is transmitted through said multiplexer and a user reflects this light while modifying one or several of its properties to transmit quantum information back to the server.

6. A multi-user quantum cryptography method comprising:
    generating a plurality of quantum information communications having different wavelengths;
    separating the plurality of quantum information communications by their wavelength; and
    supplying each quantum information communication to a respective user;
    wherein said generation of a plurality of quantum information communications includes generating pairs of entangled light signals having different wavelengths, each light signal of the entangled light signal pair being separated in said separating step and supplied to two different users; and
    wherein the two users receiving one of the entangled light signals use information from measurements on the entangled light signals to generate a secret encryption key using a quantum cryptography protocol.

* * * * *